(12) United States Patent
Kerr (10) Patent No.: US 6,409,001 B1
(45) Date of Patent: Jun. 25, 2002

(54) FULL-COMPLEMENT MULTI-DIRECTIONAL COUPLING

(75) Inventor: John Hugh Kerr, Kingston (CA)

(73) Assignee: Ker-Train Holdings LTD, Kingston (CA)

( * ) Notice: Subject to any disclaimer, the term of this patent is extended or adjusted under 35 U.S.C. 154(b) by 0 days.

(21) Appl. No.: 09/554,229

(22) PCT Filed: Nov. 26, 1998

(86) PCT No.: PCT/CA99/01072

§ 371 (c)(1),
(2), (4) Date: Jul. 13, 2000

(87) PCT Pub. No.: WO99/28645

PCT Pub. Date: Jun. 10, 1999

Related U.S. Application Data (60) Provisional application No. 60/066,666, filed on Nov. 26, 1997.

(51) Int. Cl.[7] ............................................. F16D 15/00
(52) U.S. Cl. ........................ 192/44; 192/43; 192/45.1
(58) Field of Search ................................. 192/41 R, 43, 192/44, 45, 45.1

(56) References Cited

U.S. PATENT DOCUMENTS 4,222,472 A * 9/1980 Telford .................... 192/36
4,597,467 A 7/1986 Stockton
5,234,088 A * 8/1993 Hampton ................... 192/44
6,142,277 A * 11/2000 Barnett et al. ............. 192/43.1

FOREIGN PATENT DOCUMENTS

| DE | 1575836 | 3/1970 |
|---|---|---|
| EP | 0 015 674 A1 | 9/1980 |
| EP | 0 807 561 A2 | 11/1997 |
| FR | 1542514 | 9/1968 |
| GB | 309372 | 4/1929 |
| GB | 325558 | 2/1930 |
| WO | WO 92/14072 | 8/1992 |

* cited by examiner

Primary Examiner—Charles A. Marmor
Assistant Examiner—Saúl Rodriguez
(74) Attorney, Agent, or Firm—Clark Hill PLC (57) ABSTRACT

A multi-directional coupling (10) consists of a tubular slipper (14) between a tubular member (12) and a race (16), there being engageable tubular friction surfaces (20, 36) on the slipper (14) and the race (16), and facing bearing surfaces (18, 22) on the tubular member (12) and the slipper (14) defining therebetween a channel (28) with pockets (28a) receiving roller members (30), there being an actuator (e.g. a tooth (30)) on the tubular member (12) engaging a recess (40) in the slipper (14), or a spigot or a pin(s) or a cam engageable with the slipper (14) to provide two, three or four different modes of operation (e.g. lock-up, freewheel in both directions, freewheel in one direction and/or the other).

22 Claims, 7 Drawing Sheets

FULL-COMPLEMENT MULTI-DIRECTIONAL COUPLING

This application claims benefit of Provisional appln. 60/066,666 filed Nov. 26, 1997.

FIELD OF THE INVENTION

The present invention relates to a coupling for selectively transferring torque from a torque input member to a torque output member. In particular, the present invention relates to a programmable coupling having a full complement of bearings and a plurality of operating modes for selectively transferring torque between a clutch housing and a race.

BACKGROUND OF THE INVENTION

One-way clutches and couplings are widely used in the automotive industry for transferring torque between an input shaft and an output shaft when the input shaft is rotating in one direction relative to the output shaft and for allowing the input shaft to freewheel in the opposite direction. As a result, one-way clutches have been used in torque converters and automatic transmissions to allow an input member to drive an driven member while allowing freewheeling to occur between the input member and the driven member when necessary. Examples of conventional one-way or overturning clutches include sprag clutches and roller-ramp clutches, such as those disclosed in GB 309 372 and WO 92/14072.

The sprag clutch generally comprises an outer race, an inner race, and a plurality of wedge-like elements disposed between the inner and outer race. The geometry of the sprag element is such that it allows the clutch to freewheel in one direction, but becomes wedged between the inner and outer race to lock up the clutch in the opposite direction. The roller-ramp clutch is similar to the sprag clutch but includes a plurality of roller elements in replacement of the sprag elements. Since both devices rely on a wedging action to lock up, the sprag elements, roller elements and races are subjected to extremely high radial stresses during lock up. Further, the sprag and roller elements subject the clutch to vibrations while freewheeling. As a result, such one-way clutches are prone to frequent failure.

Spiral-type one-way clutches have been developed as an improvement over sprag and roller-ramp clutches. State of the art spiral-type one-way clutch comprise an outer member having an inner spiral race, an inner member having an outer spiral race congruent with the inner spiral race, and a plurality of elongate roller bearings disposed between the inner and outer race. The elongate roller bearings reduce the frictional resistance due to the differential rotation of the spiral surfaces while providing an even distribution of compression forces on the roller bearings and races. However, as conventional spiral-type one way clutches, and one-way clutches in general, only have a single mode of operation, namely lock up in one direction and freewheeling in the opposite direction, the design of automotive equipment using such clutches is unnecessarily over-complicated.

Furthermore, spiral-type one-way clutches characteristically have larger than desirable wind-up angles. For example, it is not uncommon for a race of a conventional spiral-type one-way clutch to rotate over 10° at 6000 ft-lb of torque before full lock-up. Such large wind-up angles render the development of high-performance automotive equipment difficult. Accordingly, it would be desirable to provide a coupling having multiple modes of operation and small wind-up angles without drastically increasing the cost of the coupling.

SUMMARY OF THE INVENTION

It is an object of the present invention to overcome or reduce the problems associated with the prior art one-way clutches by providing a coupling having multiple modes of operation.

The coupling, according to the invention, consists of a race including a first tubular friction surface; a tubular member including a first circular bearing surface; a tubular slipper including a second tubular friction surface for coupling to the first tubular friction surface, and a second circular bearing surface opposite the second friction surface, the second bearing surface being coaxial to the first bearing surface and, together with the first bearing surface, defining a channel disposed therebetween. A plurality of roller elements is disposed in the channel in abutment against the bearing surfaces, the channel including a pocket retaining at least one of the roller elements therein for coupling the race to the tubular member as the tubular member and the slipper rotate relative to one another. An actuator is provided for selectively restricting rotational movement of the slipper relative to the tubular member so as to control the coupling mode of the coupling.

Preferably, the pocket consists of a first arched recess disposed in the first bearing surface, and a complementary arched recess disposed in the second bearing surface substantially in close proximity to the first arched recess. The pockets are disposed along the channel for retaining the roller elements in abutment along the channel and are shaped according to at least one of an involute curve, a logarithmic series, a geometric series and an Archimedes spiral.

BRIEF DESCRIPTION OF THE DRAWINGS

The invention will now be described, by way of example only, with reference to the drawings, in which like reference numerals indicate like elements, and in which:

FIG. 1a is an axial cross-sectional view of a full-complement multi-directional coupling according to a first aspect of the invention;

FIG. 1b is a transverse cross-sectional view of the full-complement multi-directional coupling shown in FIG. 1a;

FIG. 1c is a magnified schematic view of the actuator of the full-complement multi-directional coupling shown in FIG. 1a;

FIG. 2a is an axial cross-sectional view of a full-complement multi-directional coupling according to a second aspect of the invention;

FIG. 2b is a transverse cross-sectional view of the full-complement multi-directional coupling shown in FIG. 2a;

FIG. 2c is a magnified schematic view of the actuator of the full-complement multi-directional coupling shown in FIG. 2a;

FIG. 4a is a front plan view of an actuator of a full-complement multi-directional coupling according to a third aspect of the invention;

FIG. 4b is an axial cross-sectional view of the full-complement multi-directional coupling for the actuator shown in FIG. 4a;

FIG. 4c are transverse cross-sectional views of the full-complement multi-directional coupling shown in FIG. 4b;

FIG. 5 is a magnified schematic view of a variation of the actuator shown in FIG. 4a;

FIG. 6a is a front plan view of an actuator of a full-complement multi-directional coupling according to a fourth aspect of the invention;

FIG. 6b is an axial cross-sectional view of the full-complement multi-directional coupling for the actuator shown in FIG. 6a;

FIG. 6c are transverse cross-sectional views of the full-complement multi-directional coupling shown in FIG. 6b;

FIG. 8a is an axial cross-sectional view of the full-complement multi-directional coupling according to an eighth aspect of the invention;

FIG. 8b is a transverse cross-sectional views of the full-complement multi-directional coupling shown in FIG. 8a;

FIG. 9b is a transverse cross-sectional views of the full-complement multi-directional coupling shown in FIG. 9a;

DETAILED DESCRIPTION OF THE PREFERRED EMBODIMENT

Figures 1A, 1B, 1C, 2A, 2B, 2C:
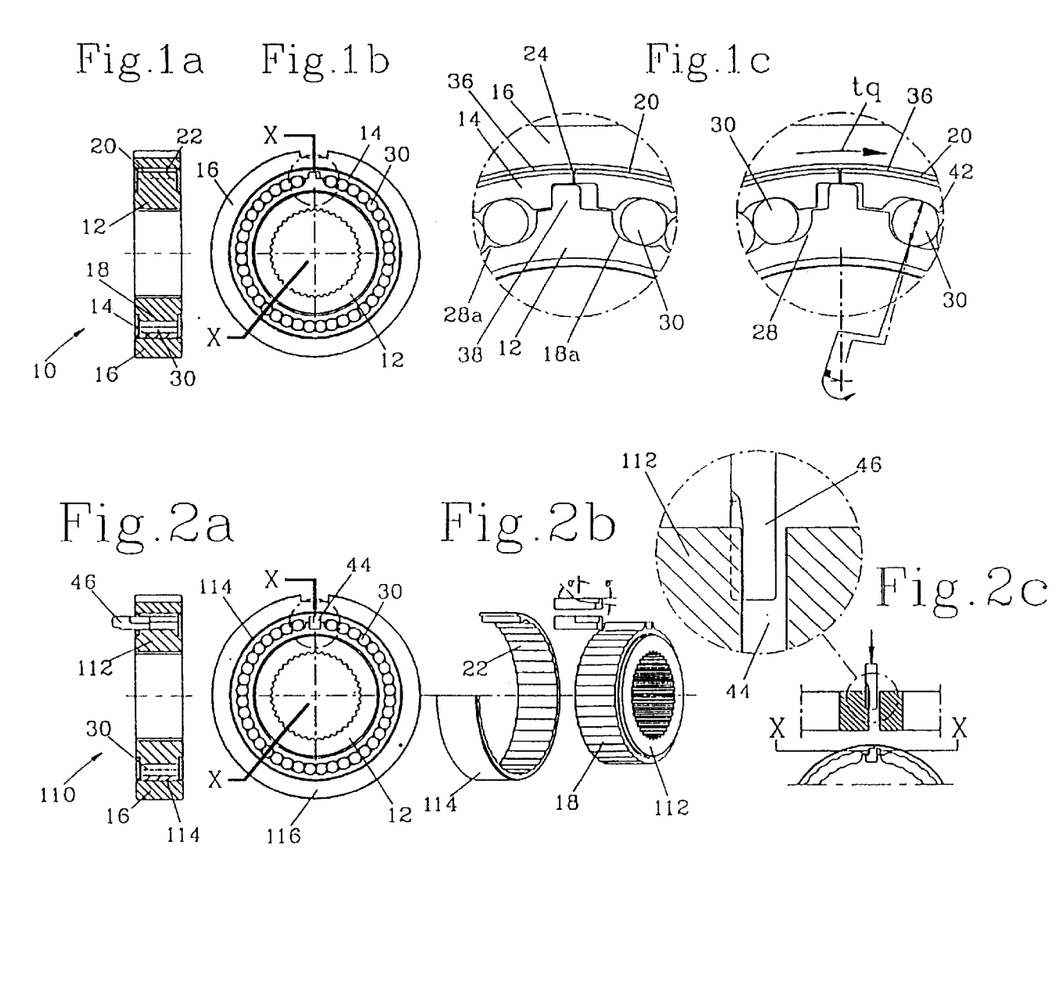

Turning to FIGS. 1a, 1b and 1c, a full-complement multi-directional coupling, denoted generally as 10, is shown comprising a tubular clutch housing 12, a resilient tubular C-shaped slipper 14 coaxial to and disposed externally to the slipper 14. The clutch housing 12 has an outer cylindrical bearing surface 18 which includes a plurality of arched recesses 18a.

The slipper 14 includes an outer cylindrical friction surface 20, and an inner cylindrical bearing surface 22. The slipper 14 is provided with a slit 24 extending between the inner cylindrical bearing surface 22 and the outer cylindrical friction surface 20 axially along the length of the slipper 14 for allowing the slipper 14 to expand and contract. The inner cylindrical bearing surface 22 is coaxial to the outer cylindrical bearing surface 18 and includes a plurality of arched recesses 22a. The arched recesses 22a are positioned substantially opposite to the first arched recesses 18a, and are complementary to the arched recesses 18a in that the arched recesses 22a are arched outwardly and the arched recesses 18a are arched inwardly.

The outer cylindrical bearing surface 18 and the inner cylindrical bearing surface 22 together define a channel 28 disposed between the clutch housing 12 and the slipper 14 extending the length of the clutch housing 12 and the slipper 14, with the arches 18a, 22a defining a plurality of pockets 28a extending the length of the channel 28. A plurality of roller bearings 30 are disposed within the channel 28 and abut against the bearing surfaces 18, 22 to provide restricted rotational movement between the slipper 14 and the clutch housing 12 in a manner to be described below. Preferably, each arched recess 18a, 22a is shaped to retain a portion of a single roller bearing 30 therein, such that each pocket 28a retains a single roller bearing 30 therein.

The race 16 includes an inner cylindrical friction surface 36 which mates with the outer cylindrical friction surface 20. An actuator is provided for coupling the race 16 to the slipper 14 and the clutch housing 12 by selectively restricting rotational movement of the slipper 14 relative to the clutch housing 12. The actuator comprises a flange 38 extending radially outwards from the outer cylindrical bearing surface 18, and a mating channel 40 provided in the inner cylindrical bearing surface 22.

The two modes of operation of the coupling 10 will now be described. If a torque is applied to the clutch housing 12 in the clockwise direction, the roller bearings 30 will move clockwise along the channel 28 in each pocket 28a. However, as shown in the rightmost breakout figure of FIG. 1c, shortly after the roller bearings 30 begin to move, they are forced to roll up the side walls 42 of the recesses 18a, 22a. Due to the slit 24 and the resilient nature of the slipper 14, the roller bearings 30 force the channel 28 and the slipper 14 to expand radially outwards, thereby increasing the radial force exerted by the slipper 14 against the race 16. As the clutch housing 12 continues to rotate clockwise, the channel 28 will continue to expand until the slipper 14 and the race 16 become locked to the clutch housing 12. At this point, the input torque from the clutch housing 12. Alternately, if input torque is applied to the race 16 rather than to the clutch housing 12, and in the counterclockwise direction, the input torque from the race 16 will be coupled to the clutch housing 12 causing the clutch housing 12 to rotate counterclockwise with the race 16.

If the direction of rotation of the clutch housing 12 is reversed, the width of the channel 28 will decrease as the roller bearings return to the valleys of the recessed portions 18a, 22a. If the clutch housing 12 was not provided with the actuator flange 38 and the mating channel 40, the roller bearings 30 would again force the channel 28 and the slipper 14 to expand radially outwards, thereby coupling the clutch housing 12 to the race 16. However, as shown in the leftmost breakout figure of FIG. 1c, the actuator flange 38 is not disposed at the midpoint. As a result, the actuator flange 38 will engage the left side wall of the mating flange 40 well before the roller bearings 30 force the channel 28 and the slipper 14 to expand radially outwards. Consequently, the radial force exerted by the slipper 14 against the race 16 does not increase as the clutch housing 12 rotates counterclockwise, and the clutch housing 12 remains uncoupled from the race 16.

It will be appreciated that the embodiment shown in FIG. 1 is a form of one-way clutch. However, the embodiment shown in FIG. 1 is a vast improvement over the prior art one-way clutches in that the strut angle is greater, allowing the coupling 10 to lock-up with less deformation of the roller bearings 30. Furthermore, the full complement structure ensures that the input torque is transferred to the race 16 over the entire set of roller bearings 30 and that lock-up occurs with a smaller wind-up angle and with little risk that roller bearings 30 may jam up when the clutch is subjected to transient rotational forces. This configuration is to be contrasted with sprag-type one-way clutches and roller ramp-type one way clutches in which the wedge elements act individually, rather than as a group. Accordingly, it is preferred that a full complement of abutting roller bearing surfaces 18, 22, with only a single bearing 30 disposed in each pocket 28 to prevent the roller bearings 30 from jamming. However, depending upon the application, the arched recesses may be applied to only one of the bearing surfaces 18, 22, or only over a portion thereof. Additionally, multiple bearings 30 could be retaining in a single pocket 28 if the clutch was not to be subjected to transient rotational forces.

The arched recesses 18a, 22a may adopt any shape suitable for retaining a roller bearing 30 therein and for allowing the roller bearing 30 to roll up the side walls of the recess and thereby lock the race 16 to the clutch housing 12. Examples of suitable shapes include those based on an involute curve, a logarithmic series, a geometric series, and Archimedes spiral or combinations thereof. However, a recess shape based on a logarithmic series is preferred as it allows the strut angle to increase as the clutch housing 12 is rotated relative to the slipper 14. As a result, the torque applied to the clutch housing 12 will initially be translated into a relatively small compression force on the bearings 30, allowing the bearing 30 to bite into the bearing surfaces 18, 22 with little deformation. Once the bearing 30 has engaged the bearing surfaces 18, 22 and the clutch housing 12 continues to rotate relative to the slipper 14, the increased strut angle will allow the race 16 to lock to the clutch housing 12 with minimal Hertizian stress and spalling.

One variation of the full complement multi-directional coupling 10 is shown in FIGS. 2a–2c. As shown therein, the coupling 110 includes a channel 44 extending through the slipper 114 and the clutch housing 112. The actuator comprises a spigot 46, tapered on one side thereof, and sized to pass into the channel 44. When the spigot 46 is partially inserted into the channel 44 to the depth shown in the breakout figure of FIG. 2c, the coupling 110 responds in much the same way as the coupling 10. Specifically, if the clutch housing 112 is rotated clockwise, clutch housing 112 will engage the left side wall of the spigot 46 well before the roller bearings 30 force the channel 28 and the slipper 114 to expand radially outwards. Consequently, the radial force exerted by the slipper 114 against the race 16 does not increase as the clutch housing 112 rotates clockwise, and the clutch housing 112 is reversed, the clutch housing 112 will be able to move relative to the slipper 114 sufficiently far so as to cause the slipper 114 to expand radially outwards, thereby coupling the clutch housing 112 to the race 16. Thus, when the spigot 46 is partially inserted into the channel 44 to the depth shown in the breakout figure of FIG. 2c, the coupling 110 acts as a one-way coupling.

If the spigot 46 is fully inserted into the channel 44, the clutch housing 112 will be prevented from rotating relative to the slipper 114 in both directions, allowing the race 16 to freewheel in both directions.

Figure 3:
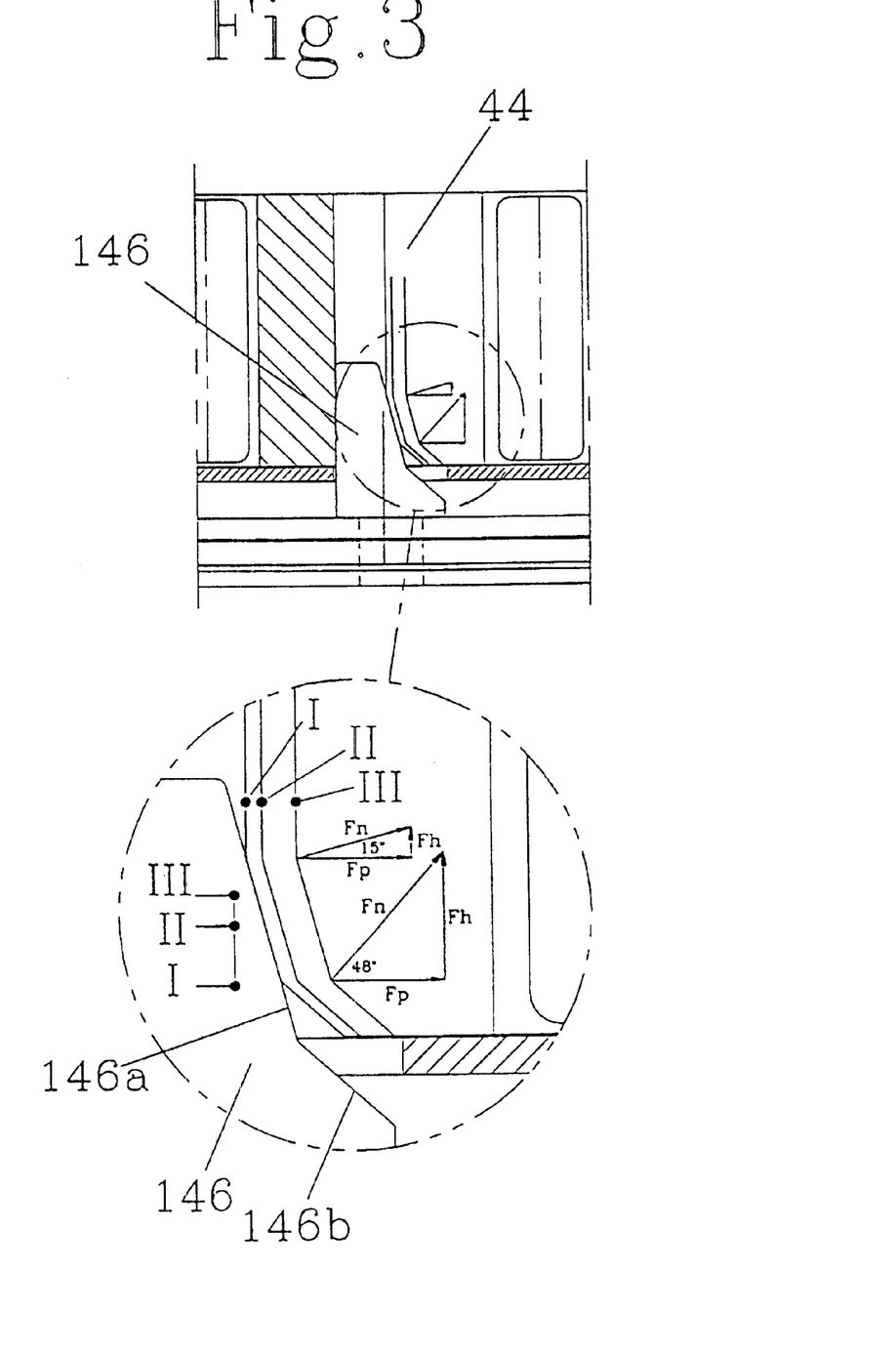
FIG. 3 are magnified schematic views of a variation of the actuator shown in FIG. 2c.

A particularly advantageous variation of the spigot 46 is shown in FIG. 3. As shown therein, the spigot 146 includes a less tapered portion 146a adjacent the leading edge of the spigot 146, and a more tapered portion 146b positioned rearwardly of the less tapered portion 146a for releasing the coupling 110 under load. As will be appreciated, the less tapered portion 146a is inserted first into the channel 44, and due to the degree of taper, readily rotates the slipper 114 in the direction opposite to that of the applied torque. Once the slipper 114 is so rotated, the degree of coupling between the clutch housing 112 and the slipper 114 is reduced sufficiently to allow the more tapered portion 146b to be inserted into the channel 44. Once the spigot 46 is fully inserted into the channel 44, the race 16 becomes uncoupled from the clutch housing 112.

Figures 4A, 4B, 4C:
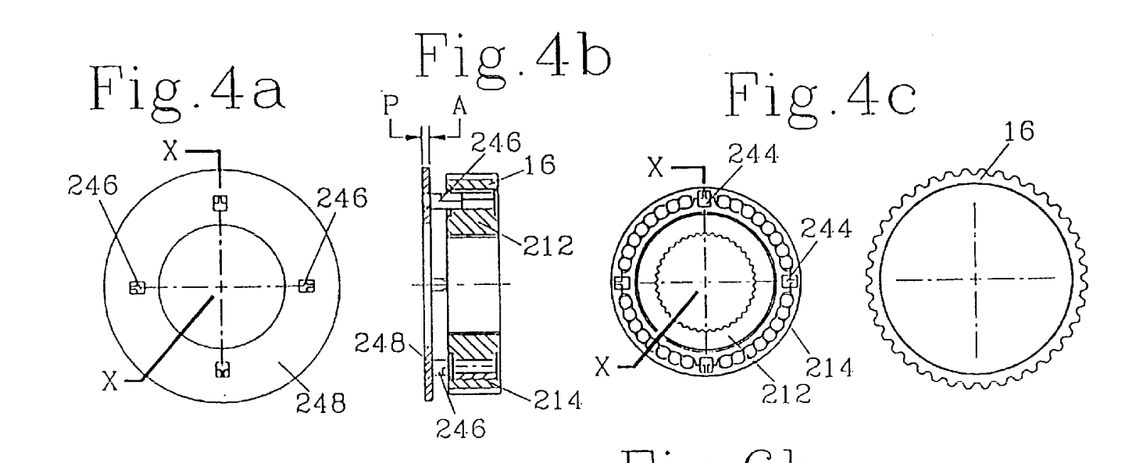
Figures 5, 6A, 6B, 6C:
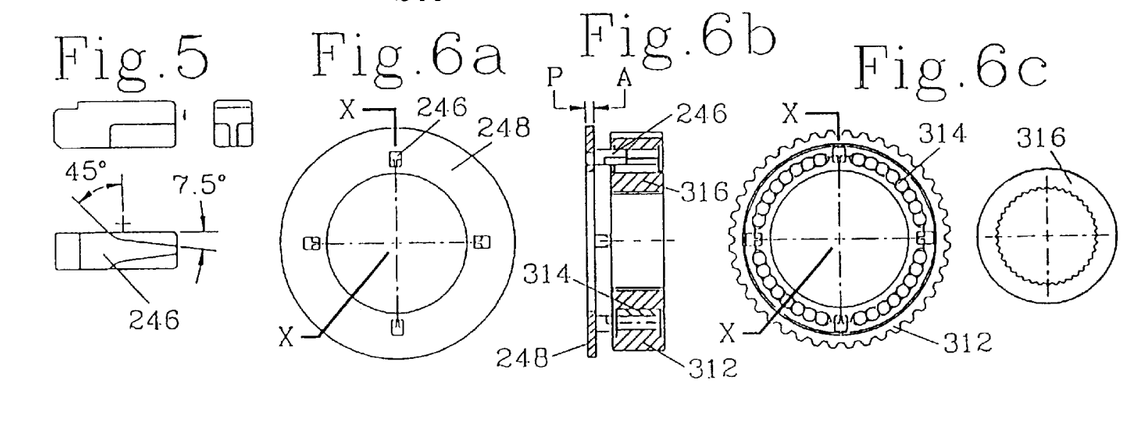

Other variations of the full complement multi-directional coupling 10 are shown in FIGS. 4, 5 and 6. The multi-directional coupling 210 shown in FIGS. 4a–4c comprises a tubular clutch housing 212, a resilient tubular C-shaped slipper 214 coaxial to and disposed externally to the clutch housing 212, and a cylindrical race 16 coaxial to and disposed externally to the slipper 214. Axially-disposed channels 244 extend through the slipper 214 and the clutch housing 212. The coupling 210 includes an actuator comprising an actuator disc 248 having a plurality of spigots 246 disposed thereon and extending axially through the channels 244. As shown in FIG. 5, the spigots 246 are tapered on two opposite sides thereof, and are sized to pass into the channels 244. AS a result, when the actuator disc 248 is disposed such that the spigots 246 are only partially entered into the channels 244, the coupling 210 will lock the clutch housing 212 to the race 16 in both directions of rotation. However, when the actuator disc 248 is disposed such that the spigots 246 are fully entered into the channels 244, the coupling 210 will unlock allowing the clutch housing 212 to freewheel with respect to the race 16 in both directions of rotation.

The multi-directional coupling 310 shown in FIGS. 6a–6c is substantially identical to the coupling 210, but comprises a tubular clutch housing 312, a resilient tubular C-shaped slipper 314 disposed internally to the clutch housing 312, and a cylindrical race 316 disposed internally to the slipper 314.

Three additional actuator structures will now be described with reference to FIG. 7. In the bottom row of figures, the actuator comprises a pin 346 which extends radially inwards through the clutch housing and engages a flange 348 provided on the slipper for providing two separate modes of operation. IN the first mode, the pin 346 engages the flange provided on the slipper for preventing relative rotation of the slipper in the clockwise direction while permitting limited relative rotation of the slipper in the counterclockwise direction. In the second mode, the pin 346 is displaced from the flange 348 and the coupling is locked in both directions. Accordingly, this structure provides a programmable one-way clutch which freewheels either in the clockwise direction or locks up in both directions In the middle row of figures of FIG. 7, the actuator comprises a rotatable cam 350 having a stem 352 and pair of opposing cam surfaces 354, 355 respectively engageable with flanges 356, 357 provided on the slipper. When the cam 350 has its stem in the neutral or upright position, as shown in the leftmost figure, the coupling is locked in both directions. When the cam 350 has its stem rotated counterclockwise, the cam surface 354 engages the flange 356 when the slipper is rotated in the clockwise direction. Therefore, in this mode, the coupling acts as a one-way coupling which couples the race to the clutch body when the race is rotated in the counterclockwise direction. When the cam 350 has its stem rotated clockwise, the cam surface 355 engages the flanges 357 when the slipper is rotated in the counterclockwise direction. Therefore, in this mode, the coupling acts as a one-way coupling which couples the race to the clutch body when the race is rotated in the clockwise direction.

Figure 7:
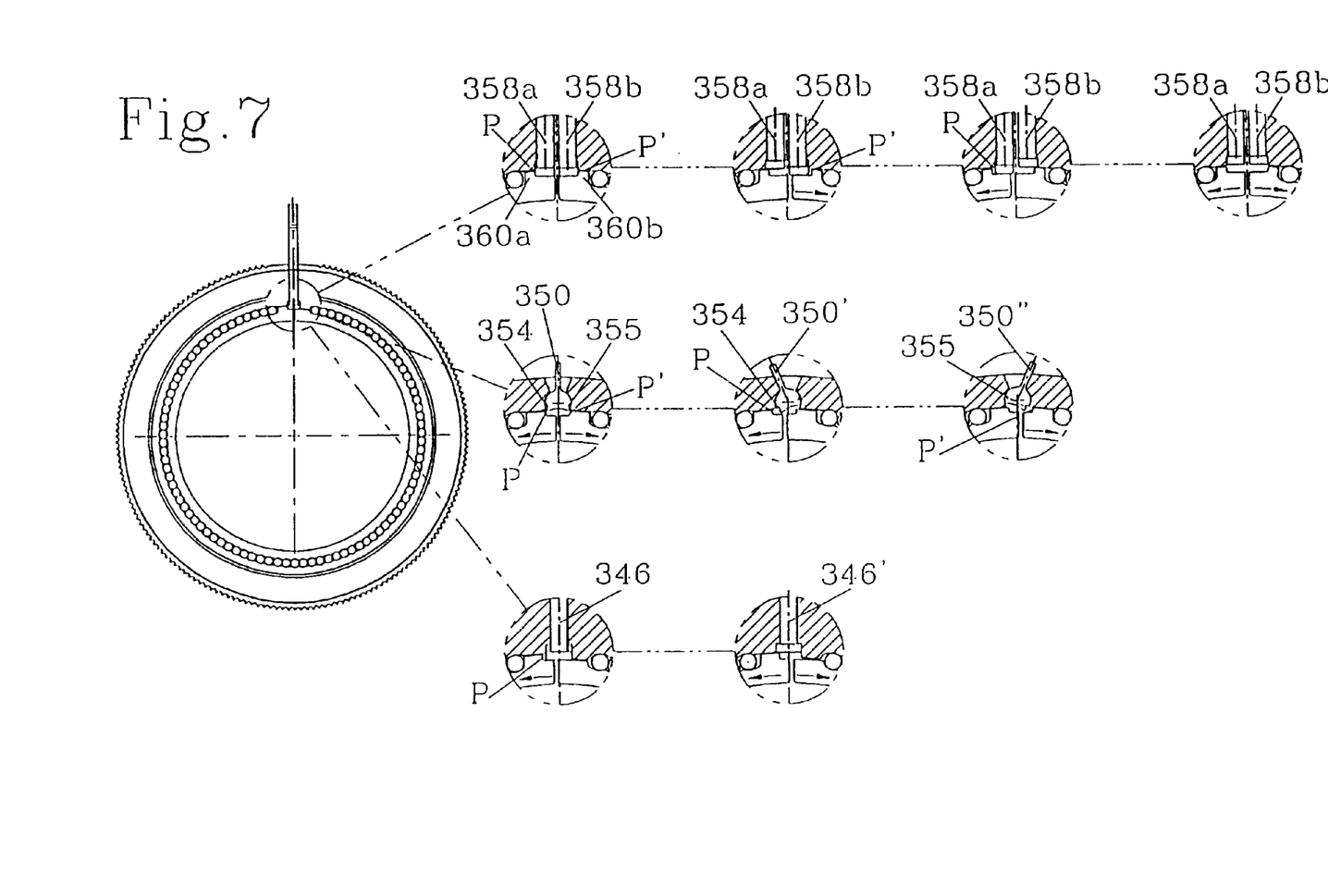
FIG. 7 are magnified schematic views of the actuator according to fifth, sixth and seventh aspects of the invention.

In the top row of figures of FIG. 7, the actuator comprises a pair of pins 358a, 358b which extend radially inwards through the clutch housing and respectively engage flange 360a, 360b provided on the slipper for providing four separate modes of operation. In the first mode, the pins 358a, 358b engage the flanges 360a, 360b for allowing free-wheeeling in both directions. In the second mode, the pin 358a is retracted from the flange 360a, thereby coupling the race to the clutch body when the race is rotated in the clockwise direction but allowing freewheeling in the counterclockwise direction. In the third mode, the pin 358b is retracted from the flange 360b, thereby coupling the race to the clutch body when the race is rotated in the counterclockwise direction but allowing freewheeling in the clockwise direction. In the fourth mode, the pins 358a, 358b are retracted from the flanges 360a, 360b for allowing full coupling in both directions.

Figures 8A, 8B:
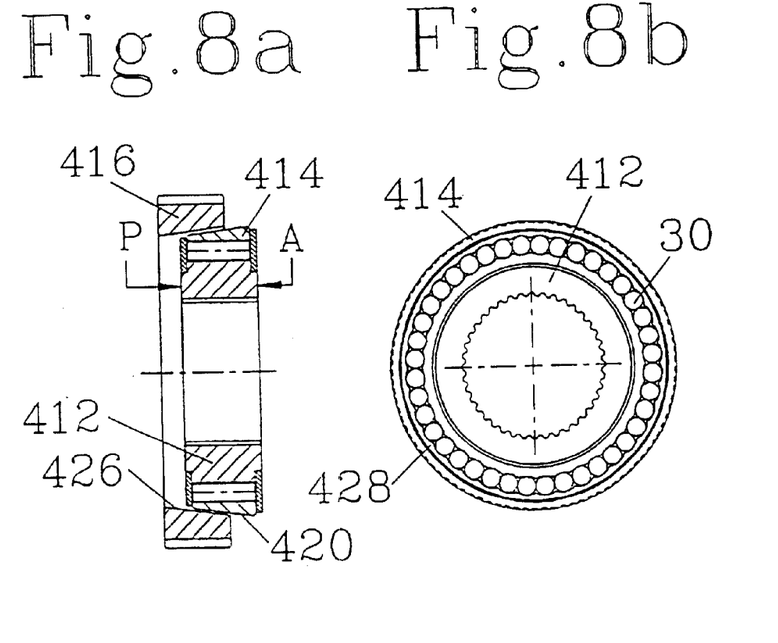

Turning now to FIGS. 8a and 8b, a multi-directional coupling 410 is shown comprising a tubular clutch housing 412, a conical slipper 414 coaxial to and disposed externally to the clutch housing 412, and a conical race 416 coaxial to and disposed externally to the conical slipper 414. The conical slipper 414 is a full conical slipper in that it lacks the slit found in the previous variations. A pocketed channel 428 formed between the inner cylindrical surface of the slipper 414 and the outer cylindrical surface of the clutch housing 412 retains a plurality of roller bearings 30 disposed therein. The slipper 414 includes an outer conical friction surface 420, and the race 416 includes an inner conical friction surface 436 which mates with the outer conical friction surface 420. An actuator ring (not shown) selectively presses the conical race 416 into engagement with the conical slipper 414 so that the inner conical friction surface 436 engages the outer conical friction surface 420. When so engaged, the race 416 becomes coupled to the clutch housing 412 in both directions. When the actuator ring withdraws the conical race 416 from the conical slipper 414, the clutch housing 412 freewheels with respect to the race 416 in both directions. In one variation of the coupling 410, the actuator ring acts upon an axially-slidable conical slipper 414 slidably engages the clutch housing 412 and the conical race 416.

Figure 9A:
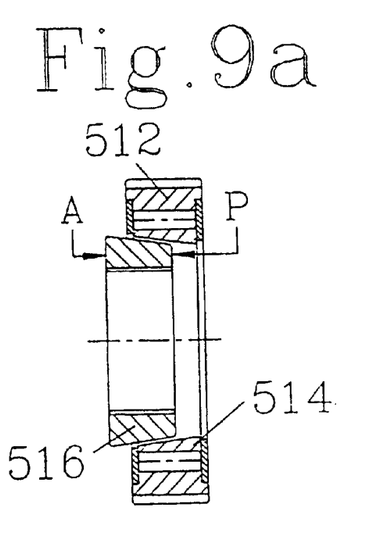
FIG. 9a is an axial cross-sectional view of the full-complement multi-directional coupling according to an ninth aspect of the invention.
Figure 9B:
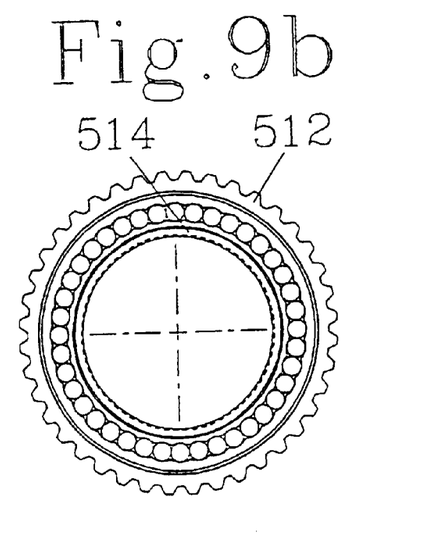

FIGS. 9a and 9b show a multi-directional coupling 510, substantially identical to the coupling 410, but comprising a tubular clutch housing 512, a full conical slipper 514 disposed internally to the clutch housing 512, and a conical race 516 disposed internally to the slipper 514. An actuator ring (not shown) selectively presses the conical race 516 into engagement with the conical slipper 514. Alternately, the actuator ring presses the conical slipper into engagement with the conical race 516 and the clutch housing 512.

Figure 10:
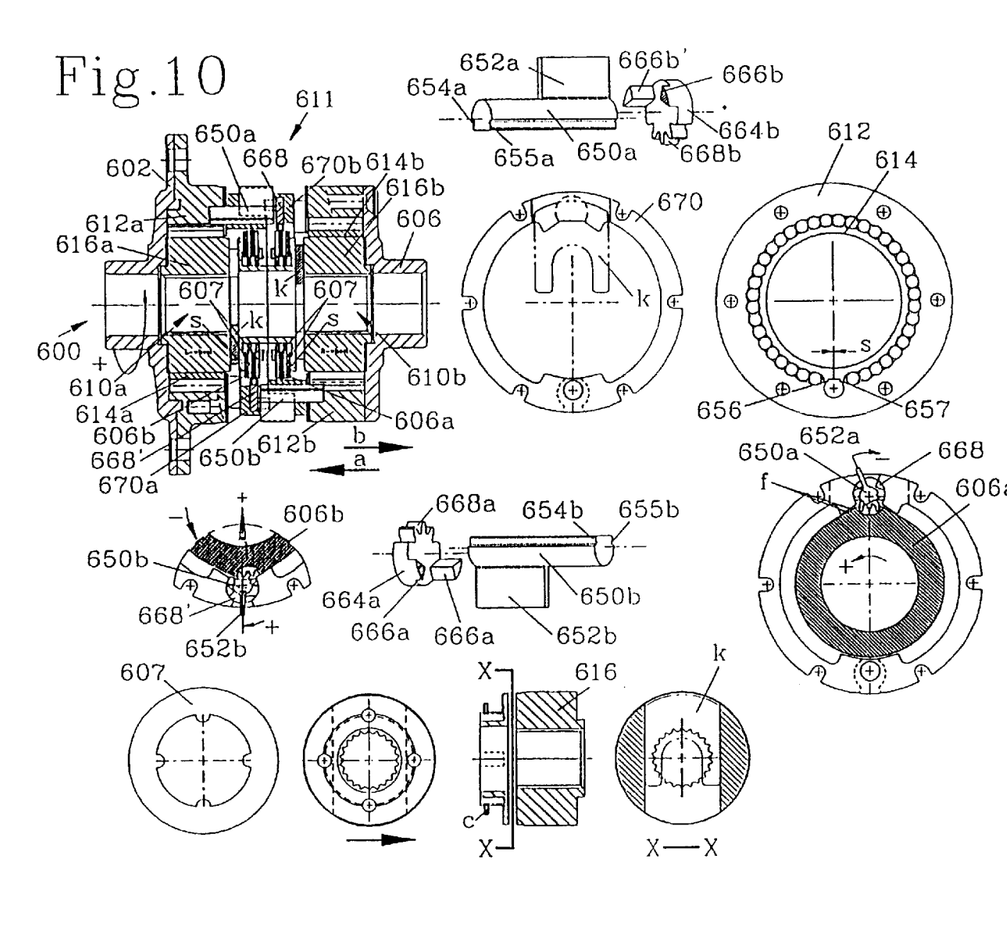
FIG. 10 are various views of a gear-less differential incorporating the full-complement multi-directional couplings.

FIG. 10 shows a gear-less differential cage assembly for use in a differential, and which employs the inventive coupling and actuator assembly described with reference to the middle row of figures of FIG. 7. The differential cage assembly, denoted generally as 600, comprises a differential cage 602, a left wheel output shaft 604, and a right wheel output shaft 606. A first multi-directional coupling 610a is coupled between the cage 602 and the left wheel output shaft 604. A second multi-directional coupling 610b is coupled between the cage 620 and the right wheel output shaft 606.

The multi-directional coupling 610a comprises a tubular clutch housing 612a coupled to the cage 602, a resilient tubular C-shaped slipper 614a coaxial to and disposed internally to the clutch housing 612a, and a cylindrical race 616a coaxial to and disposed internally to the slipper 614a. The cylindrical race 616a is coupled to the left wheel output shaft 604. The coupling 610a includes an actuator comprising a rotatable toggle 650a, similar to the cam 350 of FIG. 7, and having a stem 652a and pair of opposing cam surfaces 654a, 655a which respectively engage flanges 656a, 657a provided on the slipper 612a.

Similarly, the multi-directional coupling 610b comprises a tubular clutch housing 612b coupled to the cage 602, a resilient tubular C-shaped slipper 614b coaxial to and disposed internally to the clutch housing 612b, and a cylindrical race 616b coaxial to and disposed internally to the slipper 614b. The cylindrical race 616b is coupled to the right wheel output shaft 606. The coupling 610b includes an actuator comprising a rotatable toggle 650b, similar to the cam 350 of FIG. 7, and having a stem 652b and pair of opposing cam surfaces 654b, 655b which engage respective flanges provided on the slipper 612b.

A cross-actuator is coupled between the first and second couplings 610a, 610b for rotating the toggle 650a of the first multi-directional coupling 610a to the neutral or upright position in response to an increase in rotational speed of the right wheel output shaft 606 over the left wheel output shaft 604, and for rotating the toggle 650b of the second multi-directional coupling 610b to the neutral or upright position in response to an increase in rotational speed of the left wheel output shaft 604 over the right wheel output shaft 606. The cross-actuator comprises a first friction disc 66a coupled to the right wheel output shaft 606 and having a series of teeth 662a provided on the outer edge thereof, and a rotatable cam trigger 664a coupled to the friction disc 660a and having guides 666a for receiving the stem 652b and teeth 668a for engaging the teeth 662a. The cross-actuator also comprises a second friction disc 660b coupled to the left wheel output shaft 604 and having a series of teeth 662b provided on the outer edge thereof, and a rotatable cam trigger 664b coupled to the friction disc 660b and having guides 666b for receiving the stem 652a and teeth 668b for engaging the teeth 662b. The cross-actuator is enclosed on both sides by plates 670a, 670b which couples the cross-actuator to the cage 602, causing the cross-actuator to rotate with the cage 602.

In operation, when the vehicle is moving forward in a straight line, torque applied to the cage 602 causes the clutch housings 612 to rotate in the forward direction, thereby dragging the plates 670 in the forward direction. As a result, the stems 652 experience drag from the hydraulic fluid in the differential, causing the toggles 650 to rotate in the opposite direction and the coupling 610 to lock in the forward direction. Accordingly, torque is applied to both the left and right wheel output shafts 604, 606.

If the input torque is reduce to the cage 602, the left and right wheel output shafts 604, 606 will overrun, causing the friction discs 660 to rotate ahead of the cage 602. As a result, the cam trigger 664a on the right wheel output shaft 606 flips the toggle 652b on the left wheel output shaft 604 to the neutral position, causing the coupling 610a to lock in both directions. Similarly, the cam trigger 664b on the left wheel output shaft 604 flips the toggle 652a on the right wheel output shaft 606 to the neutral position, causing the coupling 610b to lock in both directions. AS a result, the rear wheels are forced to drive the engine.

During vehicle maneuvers, such as when the right wheel output shaft 606 is forced to rotate faster than the left wheel output shaft 604, the right wheel output shaft 606 will overrun, causing the friction disc 660a to rotate ahead of the cage 602, in effect acting as a relative rotational velocity sensor for sensing the difference in rotational speeds between the left and right wheel output shafts 604, 606. As a result, the cam trigger 664a on the right wheel output shaft 606 flips the toggle 652b on the left wheel output shaft 604 to the neutral position, causing the coupling 610a to lock in both directions. Since the position of the toggle 652a on the right wheel output shaft 606 will not change, the right wheel is allowed to overrun while torque is delivered to the left wheel. Since the left wheel is coupled to the cage in both directions, torque will be applied to the left wheel if torque is continually applied to the differential, and torque will be delivered to the engine from the left wheel if input torque is reduced.

Figure 11:
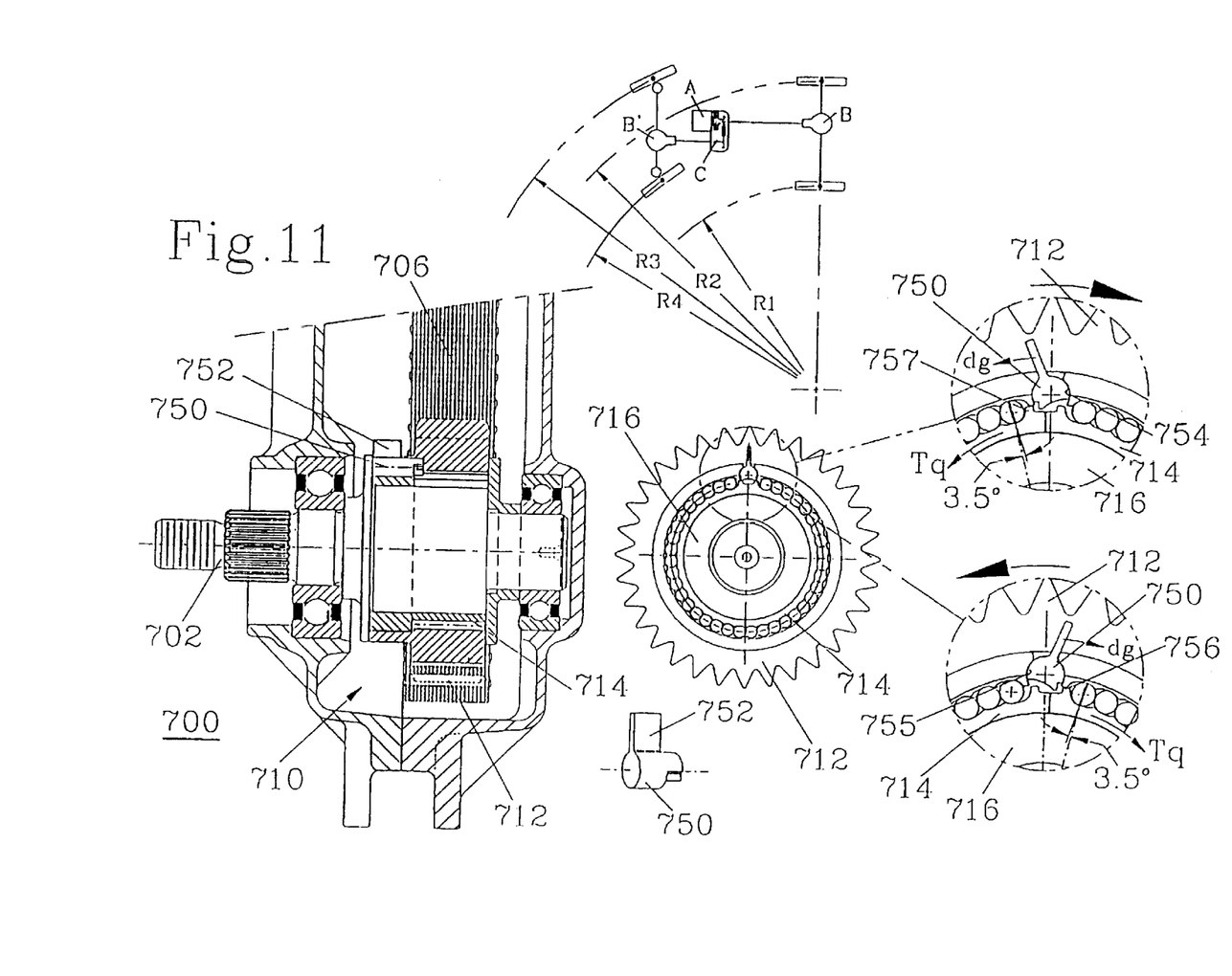
FIG. 11 are various views of a four-wheel drive transfer case incorporating the full-complement multi-directional couplings.

FIG. 11 shows the front wheel drive portion of a four-wheel drive transfer case which also employs the inventive coupling and actuator assembly described with reference to the middle row of figures of FIG. 7 The four-wheel drive transfer case, denoted generally as 700, comprises a torque input shaft (not shown), a rear wheel torque output shaft (not shown) coupled to the torque input shaft; a front wheel torque output shaft 702, a first front wheel drive sprocket and the torque transfer assembly 710. As will becomes apparent, the torque transfer assembly 704 transfers torque from the first front wheel drive sprocket to the front wheel torque output shaft 702 while allowing overrunning of the front wheel torque output shaft 702 independently of the direction of rotation of the input shaft.

The torque transfer assembly 710 comprises and externally toothed annular sprocket 712 rotatably disposed around the front wheel torque output shaft 702, a resilient tubular C-shaped slipper 714 coaxial to and disposed internally to the annular sprocket 712, and a cylindrical race 716 coaxial to and disposed internally to the slipper 714. The cylindrical race 716 is coupled to the front wheel output shaft 702. The torque transfer assembly 710 includes an actuator comprising a rotatable toggle 750, similar to the cam 350 of FIG. 7, and having a stem 752 and pair of opposing cam surfaces 754, 755 which respectively engage flanges 756, 757 provided on the slipper 712.

In operation, when the input shaft is rotating in the forward direction, the rear wheel torque output shaft will be forced to rotate in the forward direction, thereby causing the front wheel annular sprocket 712 and the front wheel torque output shaft 602 to rotate in the forward direction. As a result, the stem 752 will experience drag from the hydraulic fluid in the transfer case, causing the toggle 750 to rotate in the opposite direction and the torque transfer assembly 710 to lock in the forward direction. Accordingly, torque will be applied to the front wheel output shaft 702.

If the vehicle enters a turn, causing the front wheels to rotate faster than the rear wheels, the front wheel torque output shaft 702 will overrun the annular sprocket 712, allowing the turn to be smoothly completed. If at any time the rear wheels begin to slip, the vehicle will maintain its speed due to the power delivered to the front wheels through the torque transfer assembly 710.

When the direction of the input shaft is reversed, the rear wheel torque output shaft and the annular sprocket 712 will be forced to rotate in the counterclockwise (reverse) direction, thereby urging the automobile to move backwards. Therefore, the front wheel torque output shaft 702 will be forced to rotate in the counterclockwise direction, causing the toggle 750 to rotate in the opposite direction and the torque transfer assembly 710 to lock in the reverse direction.

The foregoing description of the preferred embodiment is intended to be illustrative of the present invention. Those of ordinary skill will be able to envisage certain additions, deletions and/or modifications to be described embodiments which, although not explicitly disclosed herein, are encompassed by the scope of the invention, as defined by the appended claims.

I claim:

1. A coupling comprising:
    a first coupling member including a first friction surface;
    a second coupling member including a first bearing surface, and a first recess provided within the first bearing surface;
    a tubular slipper disposed between the first and second coupling members, the slipper including a second friction surface for engaging with the first friction surface, and a second bearing surface coaxial to the first bearing surface, the first and second bearing surfaces defining a channel therebetween for receiving a plurality of roller elements therein, the second bearing surface including a second recess, the first and second recesses together defining a pocket opening into the channel for retaining one of the roller elements therein, the pocket being configured for coupling the first coupling member to the second coupling member as the slipper and the second coupling member rotate relative to one another, and the first recess comprises a first arched recess and the second recess comprises a second arched recess complementary in shape to the first arched recess and disposed substantially opposite to the first arched recess.

2. The coupling according to claim 1, wherein the arched recesses are shaped according to at least one of an involute curve, a logarithmic series, a geometric series and an Archimedes spiral.

3. The coupling according to claim 2, wherein the first and second bearing surfaces each comprise cylindrical bearing surfaces.

4. The coupling according to claim 3, wherein the channel includes a plurality of said pockets for retaining the roller elements in substantial abutment along the channel.

5. The coupling according to claim 1, wherein the slipper comprises a resilient tubular slipper including a slit extending between the second friction surface and the second bearing surface along a length of the slipper.

6. The coupling according to claim 5, wherein the coupling includes an actuator configured the preventing rotation of the slipper relative to the second coupling in one relative direction for facilitating limited rotation of the first coupling member relative to the second coupling member, and for permitting limited rotation of the slipper relative to the second coupling in an opposite relative direction for facilitating the coupling of the first coupling member to the second coupling member.

7. The coupling according to claim 6, wherein the actuator comprises a spigot tapered on one side thereof, the taper providing a first mode of engagement with the slipper for preventing the relative rotation of the slipper in the one relative direction while permitting the limited relative rotation of the slipper in the opposite relative direction, the taper further providing a second mode of engagement with the slipper for preventing the relative rotation of the slipper in both relative directions.

8. The coupling according to claim 7, wherein the tapered spigot includes a less tapered portion adjacent a leading edge thereof, and a more tapered portion adjacent the less tapered portion for releasing the uncoupling the first coupling member from the second coupling member under load.

9. The coupling according to claim 6, wherein the actuator comprises a spigot tapered on opposite sides thereof, the taper providing a first mode of engagement with the slipper for permitting the limited relative rotation of the slipper in both relative directions, and a second mode of engagement with the slipper for preventing the relative rotation of the slipper in both relative directions.

10. The coupling according to claim 6, wherein the actuator comprises a pin actuator providing a first mode of engagement with the slipper for preventing the relative rotation of the slipper in the one relative direction while permitting the limited relative rotation of the slipper in the opposite relative direction, the pin further providing a second mode of engagement with the slipper for preventing the relative rotation of the slipper in both relative directions.

11. The coupling according to claim 5, wherein the coupling includes a rotatable cam actuator including a pair of cam surfaces and being rotatable between a first position of engagement with the slipper for permitting rotation of the slipper relative to the second coupling member in a first relative direction for facilitating the coupling of the first coupling member to the second coupling member only in the first relative direction, and a second position of engagement with the slipper for permitting rotation of the slipper relative to the second coupling member in a second relative direction opposite the first relative direction for facilitating the coupling only in the second relative direction.

12. The coupling according to claim 11, wherein the rotatable cam actuator is further rotatable to a third position of engagement with the slipper for preventing rotation of the slipper relative to the second coupling member in both the first and second relative directions for preventing the coupling of the first coupling member to the second coupling member in the first and second relative directions.

13. The coupling according to claim 5, wherein the coupling includes a pin actuator comprising a pair of pins engageable with the slipper with a first mode of engagement for permitting rotation of the slipper relative to the second coupling member in a first relative direction for facilitating the coupling of the first coupling member to the second coupling member only in the first relative direction, a second mode of engagement for permitting rotation of the slipper relative to the second coupling member in a second relative direction opposite the first relative direction for facilitating the coupling only in the second relative direction, a third mode of engagement for permitting rotation of the slipper relative to the second coupling member in both the first and second relative directions for facilitating the coupling in the first and second relative directions, and a fourth mode of engagement for preventing rotation of the slipper relative to the second coupling member in both the first and second relative directions for preventing the coupling in the first and second relative directions.

14. The coupling according to claim 1, wherein the first friction surface comprises a conical friction surface, the second friction surface being shaped to mate with the conical friction surface, and the coupling includes an actuator ring for controlling engagement of the first friction surface with the second friction surface for selectively controlling the coupling of the first coupling member to the second coupling member.

15. A programmable multi-directional coupling comprising:

a first coupling member including a first friction surface;

a second coupling member including a first cylindrical bearing surface, and a plurality of firs recesses provided within the first bearing surface;

a tubular slipper disposed between the first and second coupling members, the slipper including a second friction surface for engaging with the first friction surface, and a second cylindrical bearing surface coaxial to the first bearing surface, the first and second bearing surfaces defining a channel therebetween, the second bearing surface including a plurality of second recesses, each said first recess together with a respective one of the second recesses defining a pocket opening into the channel, and the first recessed comprise arched recesses and the second recesses comprise arched recesses complementary in shape to the first recesses and disposed substantially opposite to the first recesses;

a plurality of roller elements disposed in the pockets for coupling the first coupling member to the second coupling member as the slipper and the second coupling member rotate relative to one another; and an actuator for controlling rotational movement of the slipper relative to the second coupling member.

16. The multi-directional coupling according to claim 15, wherein the arched recess are shaped according to at least one of an involute curve, a logarithmic series, a geometric series and an Archimedes spiral.

17. The multi-directional coupling according to claim 16, wherein each said pocket retains a single one of the roller element therein.

18. The multi-directional coupling according to claim 15, wherein the pockets are disposed for retaining the roller elements in substantial abutment along the channel.

19. A gear-less differential cage assembly comprising:

a differential cage, a left wheel output shaft and a right wheel output shaft;

a first coupling according to claim 12, coupled between the cage and the left wheel output shaft;

a second coupling according to claim 12, coupled between the cage and the right wheel output shaft;

a cross-actuator for rotating the cam of the first coupling to the third position of engagement in response to an increase in rotational speed of the right wheel output shaft over the left wheel output shaft, and for rotating the cam of the second coupling to the third position of engagement in response to an increase in rotational speed of the left wheel output shaft over the right wheel output shaft.

20. The gear-less differential according to claim 19, wherein the cross-actuator comprises a first relative rotational velocity sensor coupled between the right wheel output shaft and the differential cage, a first trigger coupled between the first relative rotational velocity sensor and the first cam, a second relative rotational velocity sensor coupled between the left wheel output shaft and the differential cage, and a second trigger coupled between the second relative rotational velocity sensor and the second cam.

21. The gear-less differential according to claim 19, wherein the first relative rotational velocity sensor comprises a toothed friction disc coupled to the right wheel output shaft, and a toothed cam coupled between the toothed friction disc and the differential cage.

22. A transfer case including hydraulic fluid and comprising:

a torque input member;

a rear wheel torque output member coupled to the torque input member;

a front wheel torque output member;

a torque transfer assembly for transferring torque from the torque input member to the front wheel torque output member, the torque transfer assembly comprising a multi-directional coupling according to any one of claims 18 to 19, coupled between the torque input member and the front wheel torque output member, with the actuator being subjected to drag from the hydraulic fluid for allowing overrunning of the front wheel torque output member independently of a direction of rotation of the torque input member.

* * * * *

UNITED STATES PATENT AND TRADEMARK OFFICE
CERTIFICATE OF CORRECTION

PATENT NO. : 6,409,001 B1
DATED : June 25, 2002
INVENTOR(S) : Kerr

It is certified that error appears in the above-identified patent and that said Letters Patent is hereby corrected as shown below:

Column 1,
Line 24, delete "an" and insert -- a --.

Column 3,
Line 21, delete "views" and insert -- view --.
Line 19, delete "an" and insert -- a --.
Line 59, delete "are" and insert -- is --.

Column 4,
Line 22, after "clutch housing 12" insert -- is coupled to the race 16 causing the race 16 to rotate clockwise with the clutch housing 12 --.

Column 6,
Line 6, delete "AS" and insert -- as --.
Line 24, delete "IN" and insert -- in --.
Line 34, insert -- a -- to read -- and a pair --.
Line 57, delete "freeewheeling" and insert -- freewheeling --.

Column 7,
Line 22, after "conical slipper 414" and before "slidably", insert -- rather than upon the axially-slidable conical race 416 so that the conical slipp[er 414 --.

Column 8,
Line 32, delete "reduce" and insert -- reduced --.
Line 41, delete "AS" and insert -- as --.

Column 9,
Line 7, delete "and" and insert -- an --.

Column 10,
Line 26, delete "the" and insert -- for --.

UNITED STATES PATENT AND TRADEMARK OFFICE
CERTIFICATE OF CORRECTION

PATENT NO. : 6,409,001 B1
DATED : June 25, 2002
INVENTOR(S) : Kerr

It is certified that error appears in the above-identified patent and that said Letters Patent is hereby corrected as shown below:

<u>Column 11,</u>
Line 47, delete "firs" and insert -- first --.
Line 57, delete "recessed" and insert -- recesses --.

<u>Column 12,</u>
Line 6, delete "recess" and insert -- recesses --.

Signed and Sealed this

Twenty-ninth Day of October, 2002

*Attest:*

JAMES E. ROGAN
*Attesting Officer*  *Director of the United States Patent and Trademark Office*